UNITED STATES PATENT OFFICE.

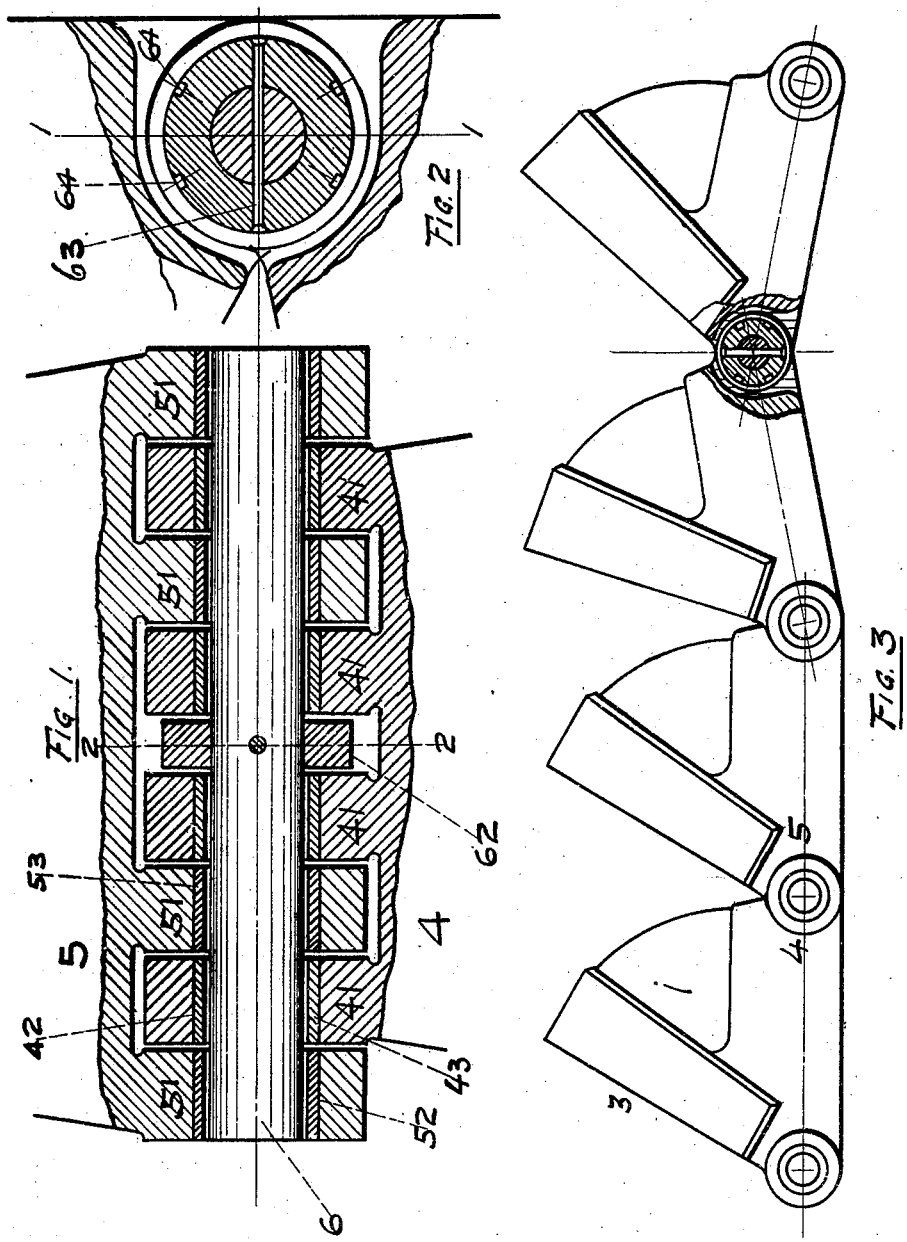

EDWARD L. VOY, OF MILWAUKEE, WISCONSIN, ASSIGNOR TO ALLIS-CHALMERS COMPANY, OF MILWAUKEE, WISCONSIN, A CORPORATION OF NEW JERSEY.

DREDGE PIN AND JOINT.

No. 845,021.   Specification of Letters Patent.   Patented Feb. 19, 1907.

Application filed June 12, 1905. Serial No. 264,803.

*To all whom it may concern:*

Be it known that I, EDWARD L. VOY, a citizen of the United States, residing at Milwaukee, in the county of Milwaukee and State of Wisconsin, have invented certain new and useful Improvements in Dredge Pins and Joints, of which the following is a specification.

This invention relates to dredge pin and joint for connecting the links of a dredge-chain.

The object of the invention is to provide a connection in which the link-pin is free to rotate and in which the link-pin is prevented from end displacement and a connection provided which is easily dismantled, readjusted, and remantled.

In the drawings, Figure 1 is a longitudinal sectional view through the axis of the link-pin on the line 1 1, Fig. 2. Fig. 2 is a transverse sectional view on the line 2 2, Fig. 1. Fig. 3 is a side elevation of the chain, partly in section.

The chain consists of links 4 5, upon each of which is mounted a bucket 1 (see Fig. 3) with its open end 3 extending to the left in this figure.

Referring to Fig. 1, the links 4 5 have each a plurality of eyes 41 41 51 51, which when the consecutive links 4 5 are connected are divided into two symmetric groups on each side of the center line of the chain. In these groups the eyes 41 51 of the consecutive links 4 5 alternate, but the alternation of eyes is not continued across the entire width of the chain. The purpose of this is to allow of a structure which uses an even number of eyes for each link and, as the eyes are all of equal width, to thus provide aggregate bearing-surfaces on each side of the pin which are equal to each other. This structure will therefore produce friction on opposite sides of the link-pin which is balanced, there being no more tendency on one side of the link-pin for a link to slide thereon than on the other. The pin will therefore wear evenly.

In each of the bores 42 52 in the eyes 41 51 of the links 4 5 is press-fitted a bushing 43 53. These, as hereinabove stated, are of equal length, so as to be interchangeable. When the links 4 5 are placed in coactive relation, the bores of the bushings 43 53 are in alinement, so that the link-pin 6 may be inserted in position to connect the links 4 5.

The link-pin 6 is held from end displacement by a locking means comprising collar 62, mounted upon the link-pin 6 between two consecutive eyes 41 41. The collar 62 is keyed upon the pin 6 by a pin 63, which extends diametrically through the link-pin 6 and collar 62. The pin 63 is riveted at both ends.

The collar 62 is located, as hereinabove stated, in the space between two consecutive eyes 41 41. In the illustration as shown in Fig. 1 this space appears along the center line of the chain and is formed by separating slightly the two groups of alternating eyes. This structure is a desirable one for symmetry, but need not be necessarily so. The space for the collar 62 may be formed between any two consecutive eyes belonging either to the same link or consecutive links.

In mantling or dismantling the connection between the links it may sometimes occur that the pin 63 is not accessible. It may be brought into accessible position by rotating the collar 62 and link-pin 6 by means on the collar 62. Such means are shown on the drawings as shallow spaced bores 64 64. By swinging the one link upon the other at a connection which is to be dismantled it is thus always possible to make accessible either end of the pin 63 or one of the bores 64. If a bore 64 appears between the links, the collar 62 may be rotated by application of a suitable tool thereto until one end of the pin 63 becomes accessible. The pin 63 is then driven out, when it will become possible to withdraw the link-pin 6 entire, and thus disconnect the links 4 5. The eyes 41 51 are thus individually accessible, so that the bushings 43 53 therein may be driven out and either angularly adjusted and replaced or displaced by a substitute new bushing.

It is to be understood that it is not desired to be limited to the exact details of construction shown and described, for obvious modifications will occur to a person skilled in the art.

What I claim is—

1. The combination of a pair of links having eyes all of uniform width, a pin uniting the links and coacting with the same number of eyes on each link, and a bushing for each eye.

2. The combination of a pair of links having eyes all of uniform width, a pin uniting the links and coacting with the same number of eyes on each link, locking means for the pin intermediate its ends, and a bushing for each eye.

3. A plurality of links, link-pins connecting the links, a collar on the link-pin, and means within the periphery of the collar for locking the collar.

In testimony whereof I affix my signature in presence of two witnesses.

EDWARD L. VOY.

Witnesses:
JOHN DAY, Jr.,
R. M. STONE.